L. PRINCE.
Invalid Bedstead.
No. 229,460. Patented June 29, 1880.
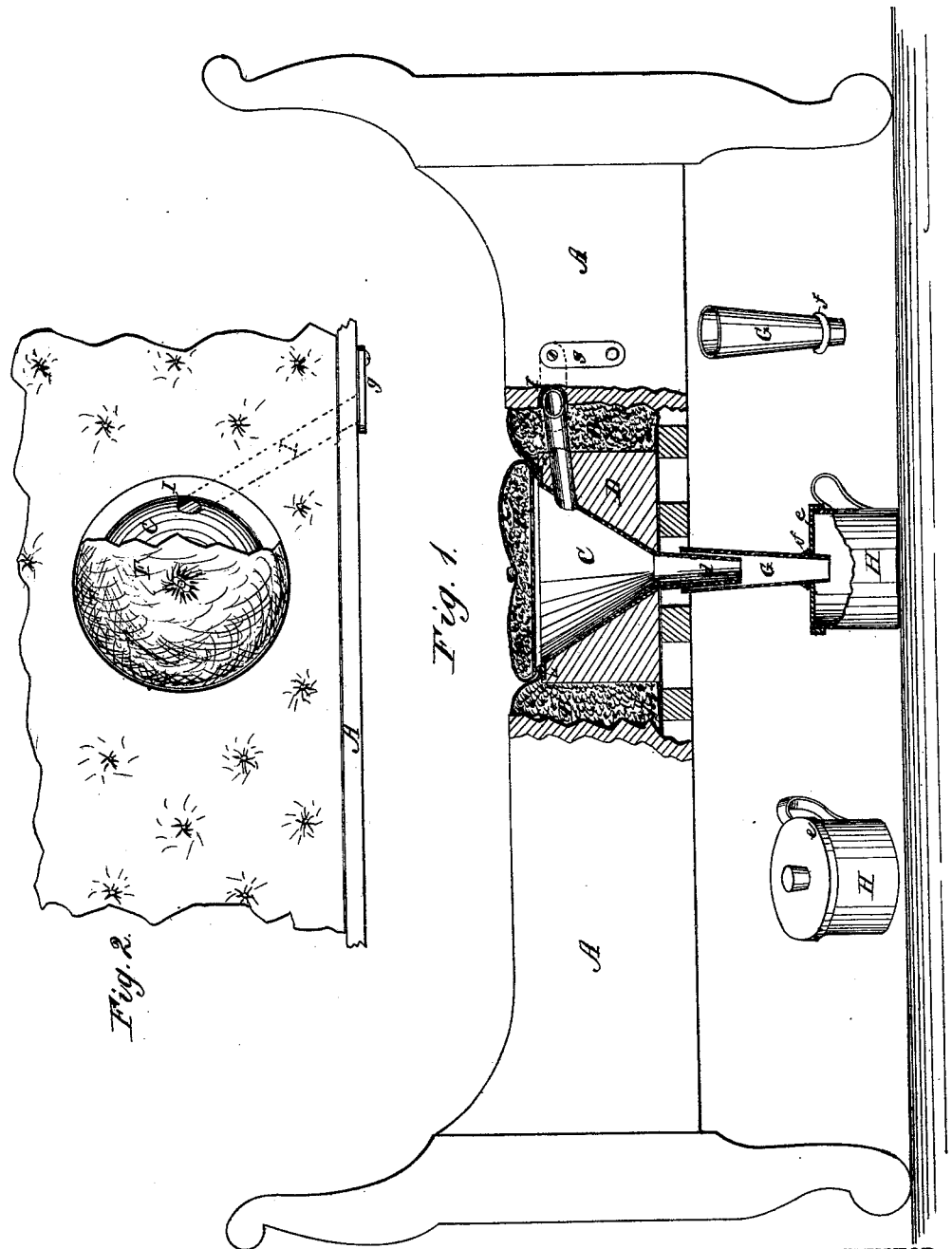

UNITED STATES PATENT OFFICE.

LOUIS PRINCE, OF JERSEY CITY HEIGHTS, NEW JERSEY.

INVALID-BEDSTEAD.

SPECIFICATION forming part of Letters Patent No. 229,460, dated June 29, 1880.

Application filed June 18, 1879.

*To all whom it may concern:*

Be it known that I, LOUIS PRINCE, of Jersey City Heights, in the county of Hudson and State of New Jersey, have invented a new and useful Improvement in Invalid-Bedsteads; and I do hereby declare that the following is a full, clear, and exact description of the same.

My invention is an improvement in the class of invalid-beds having a permanently-attached bowl or funnel.

My invention relates to the construction and arrangement of parts, as hereinafter described and claimed.

In the accompanying drawings, forming part of this specification, I have represented, in Figure 1, a side view, with part in section, of a bedstead having my improvement attached. Fig. 2 is a plan view of a portion of the bed.

The bedstead A and mattress B may be constructed in any of the usual ways. At a suitable point I locate the funnel-shaped pan or receiving-bowl C in the mattress B. The same may be supported by any suitable means; but I prefer to employ a wooden block, D, which has a conical cavity adapted to receive the pan C, and rests on, or is attached to, the slats of the bedstead.

The upper edge of the pan, which is below the surface of the mattress B, is provided with a horizontal flange, a, to which the mattress may be attached in any preferred manner.

The cover F of the pan consists of a stiff plate having a stuffed top, and is adapted to fit neatly in the cavity above the pan.

In order that the patient may use the pan B it is only necessary to draw off the cover F, which is very easily effected.

The excretions pass from the pan through a tube, G, into a removable receptacle, H, which is placed beneath the pan. The upper end of the tube G receives the nozzle d of the pan, and its lower end enters a hole in the detachable cover e of the receptacle H. The tube is also provided with a collar, f, which supports it upon said cover e. After the pan has been used the cover F is replaced, and the former is thoroughly rinsed or washed out by injecting water through the tube I, which extends from the upper part of the pan out through the side rail of the bedstead.

The requisite quantity of water may be injected by a syringe or other suitable device; and since the tube I is arranged obliquely, or as nearly tangential to the pan as practicable, the water necessarily takes a spiral course around the pan and thus passes over and cleanses every portion of it. When the pan has been thus washed the tube G is detached, and a plug placed in the hole of the cover e of the receptacle H to confine the offensive odors preparatory to removing the receptacle to a place where its contents can be discharged.

The outer end of the lateral water-conducting tube I is provided with a pivoted cap, g, for closing it, for the double purpose of concealment and preventing escape of odors.

What I claim is—

In an invalid-bed, the combination, with the bedstead A and bowl or pan C, located in or surrounded by the mattress, of the tube I, which passes through the side rail of the bedstead and terminates flush with the outer side thereof, and the pivoted cap g, for closing the mouth of said tube, all as shown and described, for the purpose specified.

LOUIS PRINCE.

Witnesses:
SOLON C. KEMON,
CHAS. A. PETTIT.